(12) United States Patent
Seda et al.

(10) Patent No.: US 12,332,143 B2
(45) Date of Patent: Jun. 17, 2025

(54) METHOD FOR MICRO-LEAKAGE DETECTION IN A FLUID SYSTEM AND MICRO-LEAKAGE DETECTION APPARATUS

(71) Applicant: PITTWAY SARL, Rolle (CH)

(72) Inventors: Libor Seda, Chocen (CZ); Jaroslav Svoma, Brno (CZ); Vaclav Prajzner, Brno (CZ)

(73) Assignee: Pittway Sarl, Rolle (CH)

( * ) Notice: Subject to any disclaimer, the term of this patent is extended or adjusted under 35 U.S.C. 154(b) by 289 days.

(21) Appl. No.: 17/999,078

(22) PCT Filed: May 5, 2021

(86) PCT No.: PCT/EP2021/061864
§ 371 (c)(1),
(2) Date: Nov. 17, 2022

(87) PCT Pub. No.: WO2021/233683
PCT Pub. Date: Nov. 25, 2021

(65) Prior Publication Data
US 2023/0194379 A1    Jun. 22, 2023

(30) Foreign Application Priority Data

May 19, 2020  (EP) .................................... 20175432

(51) Int. Cl.
*G01M 3/26*    (2006.01)
(52) U.S. Cl.
CPC ..................................... *G01M 3/26* (2013.01)
(58) Field of Classification Search
CPC ........................................................ G01M 3/26
See application file for complete search history.

(56) References Cited

U.S. PATENT DOCUMENTS 4,336,708 A   6/1982  Hobgood et al.
4,841,149 A * 6/1989  Martin .................... G01M 3/04
                                                      250/330

(Continued)

FOREIGN PATENT DOCUMENTS

EP    2180304 A1   4/2010
GB    2572274 A    9/2019

OTHER PUBLICATIONS

International Search Report and Written Opinion in International PCT Application No. PCT/EP2021/061864 mailed Aug. 17, 2021.

*Primary Examiner* — Eric S. McCall
(74) *Attorney, Agent, or Firm* — Greenberg Traurig, LLP; Ryan D. Sharp; David J. Dykeman (57) ABSTRACT

Method for micro-leakage detection in a fluid system (10), preferably in a potable water system installed in a building (11), wherein the fluid system (10) has a fluid pipe (12) with a fluid valve (14), wherein a fluid flow through the fluid pipe (12) is stopped when the fluid valve (14) is closed, and wherein a fluid flow through the fluid pipe (12) is allowed when the fluid valve (14) is opened. The method comprises the following steps: Measuring the fluid flow through the fluid pipe (12) by a flow meter (16). Measuring the pipe temperature of the fluid pipe (12) by at least one pipe temperature sensor (17*a*, 17*b*). When there is no fluid flow measured by the flow meter (16), particularly because or when the fluid flow through the fluid pipe (12) is stopped by the fluid valve (14) being closed, analyzing the pipe temperature for the micro-leakage detection.

13 Claims, 5 Drawing Sheets

(56) References Cited

U.S. PATENT DOCUMENTS

| | | |
|---|---|---|
| 10,527,516 B2 | 1/2020 | Banerjee et al. |
| 2012/0206272 A1 | 8/2012 | Borlee |
| 2019/0063689 A1* | 2/2019 | Liu .................... G01M 3/2815 |
| 2019/0128762 A1 | 5/2019 | Bailey et al. |
| 2019/0154535 A1* | 5/2019 | Cole .................... G01M 3/002 |
| 2019/0154539 A1 | 5/2019 | Banerjee et al. |
| 2020/0326258 A1* | 10/2020 | Bailey .................. G01M 3/002 |
| 2020/0370992 A1* | 11/2020 | Horger ................ G01F 1/6847 |
| 2022/0334195 A1* | 10/2022 | Zheng ................ G01R 31/396 |

\* cited by examiner

METHOD FOR MICRO-LEAKAGE DETECTION IN A FLUID SYSTEM AND MICRO-LEAKAGE DETECTION APPARATUS

CROSS-REFERENCE TO RELATED APPLICATIONS

This application is a U.S. National Phase patent application under 35 U.S.C. 371 of International Application No. PCT/EP2021/061864 filed May 5, 2021, which claims the benefit of and priority to European Patent Application No. 20175432.2, filed on May 19, 2020, each of which are incorporated herein by reference in their entireties.

The invention relates to a method for micro-leakage detection in a fluid system. Further on, the invention relates to a micro-leakage detection apparatus suitable for micro-leakage detection in a fluid system.

US 2019/0128762 A1 discloses an apparatus for fluid flow detection. The apparatus makes use of a signal provided by a pipe temperature sensor and of a signal provided by an ambient temperature sensor. A low flow algorithm may attempt to detect flow leaks such as a dripping tap. If no leak is present during a quiet period, the ambient temperature and pipe temperature will generally tend to be close together. If, on the other hand, a low flow leak is present during a quiet period, there will be generally a noticeable difference between the ambient temperature and pipe temperature.

EP 2 180 304 A1, GB 2 572 274 A, U.S. Pat. Nos. 4,336,708 A, 10,527,516 B2 as well as JP 6 611 650 B2 disclose other prior art.

Against this background, a novel method for micro-leakage detection in a fluid system and a novel micro-leakage detection apparatus are provided.

The novel method for micro-leakage detection in a fluid system comprises at least the following steps:

Measure the fluid flow through a fluid pipe by a flow meter.

Measure the pipe temperature of the fluid pipe by at least one pipe temperature sensor.

When there is no fluid flow measured by the flow meter, particularly because or when the fluid flow through the fluid pipe is stopped by the fluid valve being closed, analyze the pipe temperature for the micro-leakage detection.

The novel method for micro-leakage detection is based both on a flow measurement by a flow meter and a pipe temperature measurement by the at least one pipe temperature sensor. The novel method allows a very simple and reliable micro-leakage detection in a fluid system. The micro-leakage which can be detected by making use of the invention is below a measuring resolution or a measuring range of the flow meter.

The pipe temperature of the fluid pipe may be measured by the at least one pipe temperature sensor when the fluid flow through the fluid pipe is allowed and when the fluid flow through the fluid pipe is stopped, wherein the measured fluid flow is analyzed for the micro-leakage detection only if there is no fluid flow measured by the flow meter. In this case, the at least one pipe temperature sensor is active and measures the pipe temperature when fluid flow is measured by the flow meter and when no fluid flow is measured by the flow meter. However, the measured pipe temperature is analyzed for micro-leakage detection only under the condition that there is no fluid flow measured by the flow meter.

Alternatively, the pipe temperature of the fluid pipe may both be measured and analyzed for the micro-leakage detection only when the fluid flow through the fluid pipe is stopped. In this case, the at least one pipe temperature sensor is inactive when fluid flow is measured by the flow meter. The at least one pipe temperature sensor then becomes activated when no fluid flow is measured by flow meter. In this case, the pipe temperature is measured and analyzed for micro-leakage detection only under the condition that there is no fluid flow measured by the flow meter.

According to a first embodiment of the method for micro-leakage detection the same has the additional following steps: When there is no fluid flow measured by the flow meter after the fluid flow through the fluid pipe has been stopped, calculate a temporal gradient of the pipe temperature. If the temporal gradient of the pipe temperature differs more than a first threshold from a first reference value, and if there is no flow measured by the flow meter, then detect micro-leakage.

According to a second embodiment of the method for micro-leakage detection the same has the additional following steps: Measure the pipe temperature of the fluid pipe by a first pipe temperature sensor and by a second pipe temperature sensor being positioned at different locations of the fluid pipe. When there is no fluid flow measured by the flow meter for the defined time interval, calculate a temperature difference between the pipe temperatures measured by the first and second pipe temperature sensors. If the temperature difference between the pipe temperatures differs more than a second threshold from a second reference value, and if there is no flow measured by the flow meter, then detect micro-leakage.

The above first and second embodiments are preferred. The same are ambient temperature independent and do not require the measurement of the ambient temperature. Such an ambient temperature independent micro-leakage detection is very simple and reliable. It is possible to use the first and second embodiment in combination, meaning that micro-leakage is detected if the temporal gradient of the pipe temperature differs more than the first threshold from the first reference value and/or if the temperature difference between the pipe temperatures differs more than the second threshold from the second reference value.

The novel micro-leakage detection apparatus suitable for micro-leakage detection in a fluid system includes an interface configured to receive a signal from a flow meter measuring the fluid flow through a fluid pipe of the fluid system. In some embodiments, an interface is configured to receive a signal from at least one pipe temperature sensor measuring the pipe temperature of the fluid pipe. In some embodiments, a processor is configured to detect micro-leakage by analyzing the pipe temperature when there is no fluid flow measured by the flow meter.

Preferred developments of the invention are provided by the dependent claims and the description which follows.

Exemplary embodiments are explained in more detail on the basis of the drawing, in which.

Figure 1:
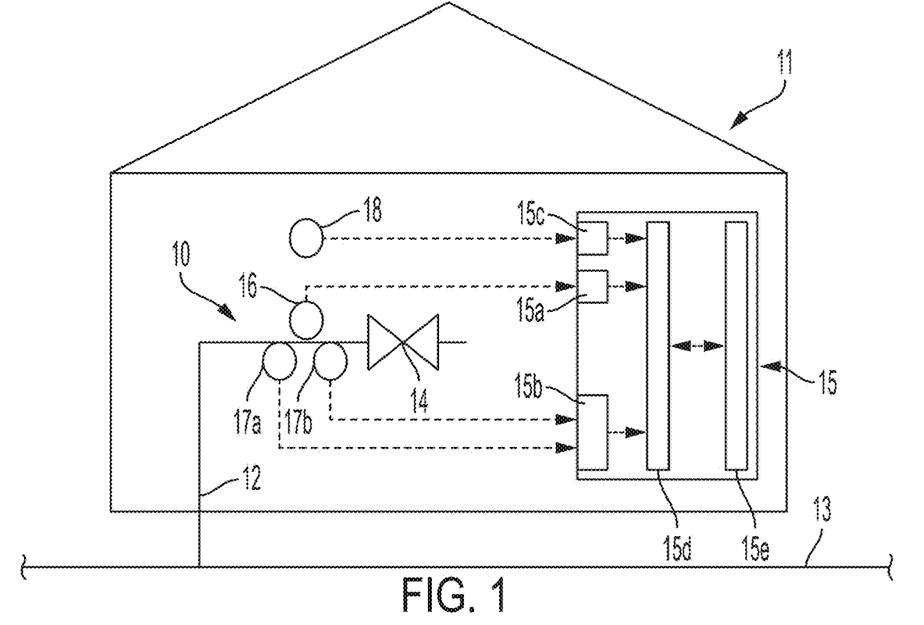
FIG. 1 shows a schematic diagram of a fluid flow system.

FIG. 1 shows a schematic diagram of a fluid flow system 10, namely of a potable water system, of a building 11. The fluid flow system 10 comprises a fluid pipe 12 running at least partially inside of the building 11. This fluid pipe 12 is connected to a main water pipe 13 running outside of the building 11. This fluid pipe 12 comprises a fluid valve 14. The fluid valve 14 may be a water tap. A fluid flow through the fluid pipe 12 is stopped when the fluid valve 14 is closed. A fluid flow through the fluid pipe 12 is allowed when the fluid valve 14 is opened. The fluid pipe 12 may be made from a metal like copper or from a plastic like polypropylene.

The present invention relates to a method for micro-leakage detection in the fluid system 10 and to a micro-leakage detection apparatus. FIG. 1 shows such a micro-leakage detection apparatus 15.

The micro-leakage detection apparatus 15 receives at least signals from a flow meter 16 and from at least one pipe temperature sensor 17a, 17b.

The flow meter 16 is assigned to the fluid pipe 12 and measures the fluid flow through the fluid pipe 12.

The flow meter 16 has a measuring range or measuring resolution. The flow meter 16 is configured to measure a fluid flow through the fluid pipe 12 when the fluid valve 14 is opened, meaning that there is a regular fluid consumption across the fluid valve 14. However, when the fluid valve 14 is closed, there may be an irregular fluid consumption caused by micro-leakage. The micro-leakage causes a certain fluid flow being below the measuring range or measuring resolution of the flow meter 16. So, micro-leakage cannot be detected by the flow meter 16 as such, namely by the flow meter 16 alone.

The at least one pipe temperature sensor 17a, 17b is also assigned to the fluid pipe 12 and measures the pipe temperature of the fluid pipe 12.

FIG. 1 shows a first pipe temperature sensor 17a and a second pipe temperature sensor 17b. Further, FIG. 1 shows an ambient temperature sensor 18 measuring an ambient temperature within the building. The ambient temperature sensor 18 may be positioned in the proximity of the fluid pipe 12. Only one of the first and second temperature sensors 17a, 17b and the flow meter 16 are mandatory units for the present invention. The ambient temperature sensor 18 is an optional unit. If an ambient temperature sensor 18 is present, the same is preferably positioned in the proximity of the fluid pipe 12.

A first embodiment of the invention makes use of at least one pipe temperature sensor 17a, 17b and of the flow meter 16 only.

A second embodiment of the invention makes use of the first and second pipe temperature sensors 17a and 17b and of the flow meter 16.

The micro-leakage detection apparatus 15 has an interface 15a being configured to receive signals or data from the flow meter 16 and an interface 15b being configured to receive signals or data from the at least one pipe temperature sensor 17a, 17b.

A third embodiment makes use of at least one pipe temperature sensor 17a, 17b, of the flow meter 16 and of the ambient temperature sensor 18. In this case the micro-leakage detection apparatus 15 has an interface 15c being configured to receive signals or data from the ambient temperature sensor 18.

The method for micro-leakage detection in the fluid system 10 comprises at least the following steps:

Measure the fluid flow through the fluid pipe 12 by the flow meter 16.

Measure the pipe temperature of the fluid pipe 12 by at least one pipe temperature sensor 17a, 17b.

When there is no fluid flow measured by the flow meter 16 because or when the fluid flow through the fluid pipe 12 is stopped by the closed fluid valve 14, analyze the pipe temperature for the micro-leakage detection.

The pipe temperature of the fluid pipe 12 may be measured by at least one pipe temperature sensor 17a, 17b when the fluid flow through the fluid pipe 12 is allowed and when the fluid flow through the fluid pipe 12 is stopped, wherein the measured fluid flow is analyzed for the micro-leakage detection only when there is no fluid flow measured by the flow meter 16.

In this case, the at least one pipe temperature sensor 17a, 17b is active and measures the pipe temperature when fluid flow is measured by the flow meter 16 and when no fluid flow is measured by the flow meter 16. However, the measured pipe temperature is analyzed for micro-leakage detection only under the condition that there is no fluid flow measured by the flow meter 16.

Alternatively, the pipe temperature of the fluid pipe 12 may both be measured and analyzed for the micro-leakage detection only when the fluid flow through the fluid pipe 12 is stopped by the fluid valve 14.

In this alternative case, the at least one pipe temperature sensor 17a, 17b is inactive or becomes inactivated when fluid flow is measured by the flow meter 16. The at least one pipe temperature sensor 17a, 17b is active or becomes activated when no fluid flow is measured by flow meter 16. In this case, the pipe temperature is both measured and analyzed for micro-leakage detection only under the condition that there is no fluid flow measured by the flow meter 16.

The method for micro-leakage detection is based both on a flow measurement by the flow meter 16 and pipe temperature measurement by the at least one pipe temperature sensor 17a, 17b. The method allows a very simple and reliable micro-leakage detection in the fluid system 10. The invention allows to detect micro-leakage that causes a fluid flow being below the measuring range or measuring resolution of the flow meter 16.

The micro-leakage detection apparatus 15 is configured to execute the above method steps. The interface 15a of the micro-leakage detection apparatus 15 is configured to receive signals or data from the flow meter 16 measuring the fluid flow through the fluid pipe 12. The interface 15b of the micro-leakage detection apparatus 15 is configured to receive signals or data from the at least one pipe temperature sensor 17a, 17b measuring the pipe temperature of the fluid pipe 12.

A processor 15d of the micro-leakage detection apparatus 15 is configured to detect micro-leakage by analyzing the pipe temperature provided by the at least one pipe temperature sensor 17a, 17b when there is no fluid flow measured by the flow meter 16. The micro-leakage detection apparatus 15 further comprises a memory 15e.

If the pipe temperature of the fluid pipe 12 is both measured and analyzed only when there is no fluid flow measured by the flow meter 16, then the processor 15d of the micro-leakage detection apparatus 15 is configured to active the least one pipe temperature sensor 17a, 17b under the condition that there is no fluid flow measured by the flow meter 16.

As mentioned above, a first embodiment of the invention makes use of at least one pipe temperature sensor 17a and/or 17b and of the flow meter 16 only. In the following description of the first embodiment it is presumed that the pipe temperature sensor 17a is used for the measurement of the pipe temperature. In this first embodiment a temporal gradient of the pipe temperature measured by the pipe temperature sensor 17a is calculated when there is no fluid flow measured by the flow meter 16 after the fluid flow through the fluid pipe 12 has been stopped. The condition that the fluid flow has been stopped can be detected on basis of the signal provided by the flow meter 16, namely when there is fluid flow measured by the flow meter 16 and subsequently no fluid flow measured by the flow meter 16. The temporal gradient is also often called gradient over time. If the temporal gradient of the pipe temperature differs more than a first threshold from a first reference value, and if there is no flow measured by the flow meter 16, then micro-leakage is detected.

Figure 2:
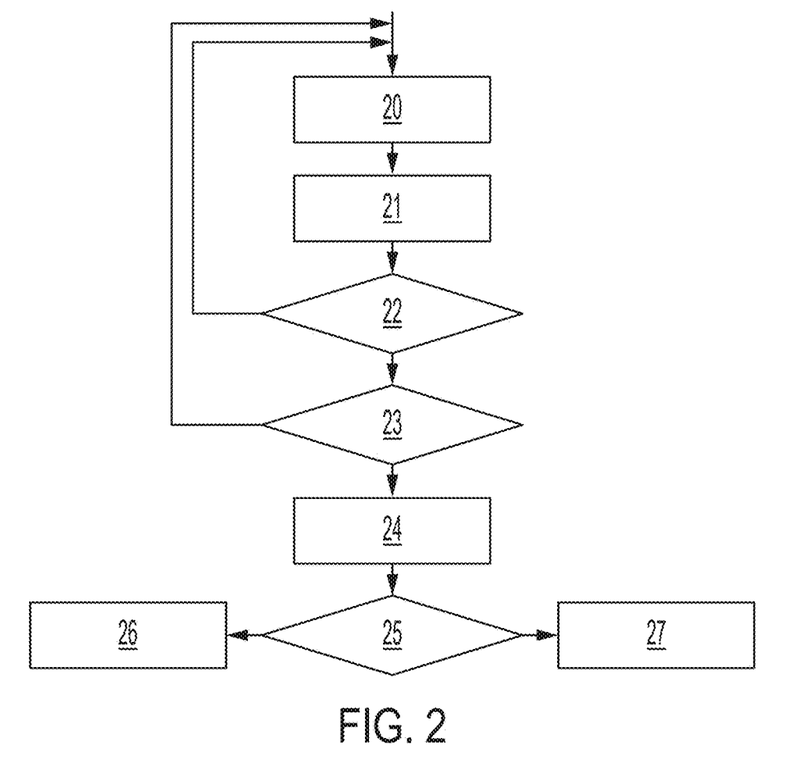
FIG. 2 shows a signal flow diagram illustrating a first embodiment.

FIG. 2 shows a signal flow diagram for the first embodiment of the invention.

In step 20 the flow meter 16 measures the fluid flow though the fluid pipe 12. In step 21 the pipe temperature sensor 17a measures the pipe temperature of the fluid pipe 12.

In step 22 it is determined if the flow meter 16 measures a fluid flow through the fluid pipe 12. If it is determined in step 22 that the flow meter 16 measures a fluid flow through the fluid pipe 12, then the method goes back to step 20. If it is determined in step 22 that the flow meter 16 measures no fluid flow through the fluid pipe 12, then the method goes to step 23.

In step 23 is determined if the flow meter 16 measures no fluid flow through the pipe. If this is not the case, the method goes back to step 20. If this is the case, the method goes to step 24. In step 24 the temporal gradient—also often called gradient over time—of the pipe temperature measured by the pipe temperature sensor 17a is calculated.

Then, in step 25 it is determined if the temporal gradient of the pipe temperature differs more than a first threshold from a first reference value or not.

If the temporal gradient of the pipe temperature does not differ more than the first threshold from the first reference value, no micro-leakage is detected in step 26. If the temporal gradient of the pipe temperature differs more than the first threshold from the first reference value, and if there is still no fluid flow measured by the flow meter 16, then in step 27 micro-leakage is detected.

In connection with the first embodiment, alternatively the pipe temperature sensor 17b may be used for the measurement of the pipe temperature. Further on, both pipe temperature sensors 17a, 17b may be used and an average value may be calculated for the pipe temperature.

The first reference value for the temporal gradient of the pipe temperature may be determined as follows: If there is no fluid flow measured after the fluid flow through the fluid pipe has been stopped, then calculate and store the temporal gradient of the pipe temperature. Calculate an average value from the stored temporal gradients. Determine the first threshold from this average value.

The average value may be multiplied by a security-factor to determine the first reference value.

The above method is executed by the micro-leakage detection apparatus 15 in or at a defined sampling rate. The calculation of the temporal gradient may take place at each sampling time of the sampling rate. However, the calculated temporal gradient may not be stored at each sampling time of the sampling rate. It is possible that the calculated temporal gradient is only stored example given every 10 times or every 20 times or every 50 times or every 100 times after calculation of the same. These calculated temporal gradients may be stored in a ring buffer of the memory 15e of the micro-leakage detection apparatus 15. The ring buffer may have a defined buffer size. If the ring buffer is completely filled, then the average value from the stored temporal gradients may be calculated. If the the ring buffer is not completely filled, then the average value may not be calculated. If the ring buffer is completely filled and if a newly calculated temporal gradient is to be stored, then the oldest one of the stored temporal gradients becomes replaced by the newly calculated temporal gradient and the average value is newly calculated.

The calculated temporal gradient may only be stored and used to calculate the average value if the absolute value of a difference between the calculated temporal gradient and a previously calculated temporal gradient or the absolute value of a difference between the calculated temporal gradient and an average value of previously stored temporal gradients is below a respective threshold.

Figure 5:
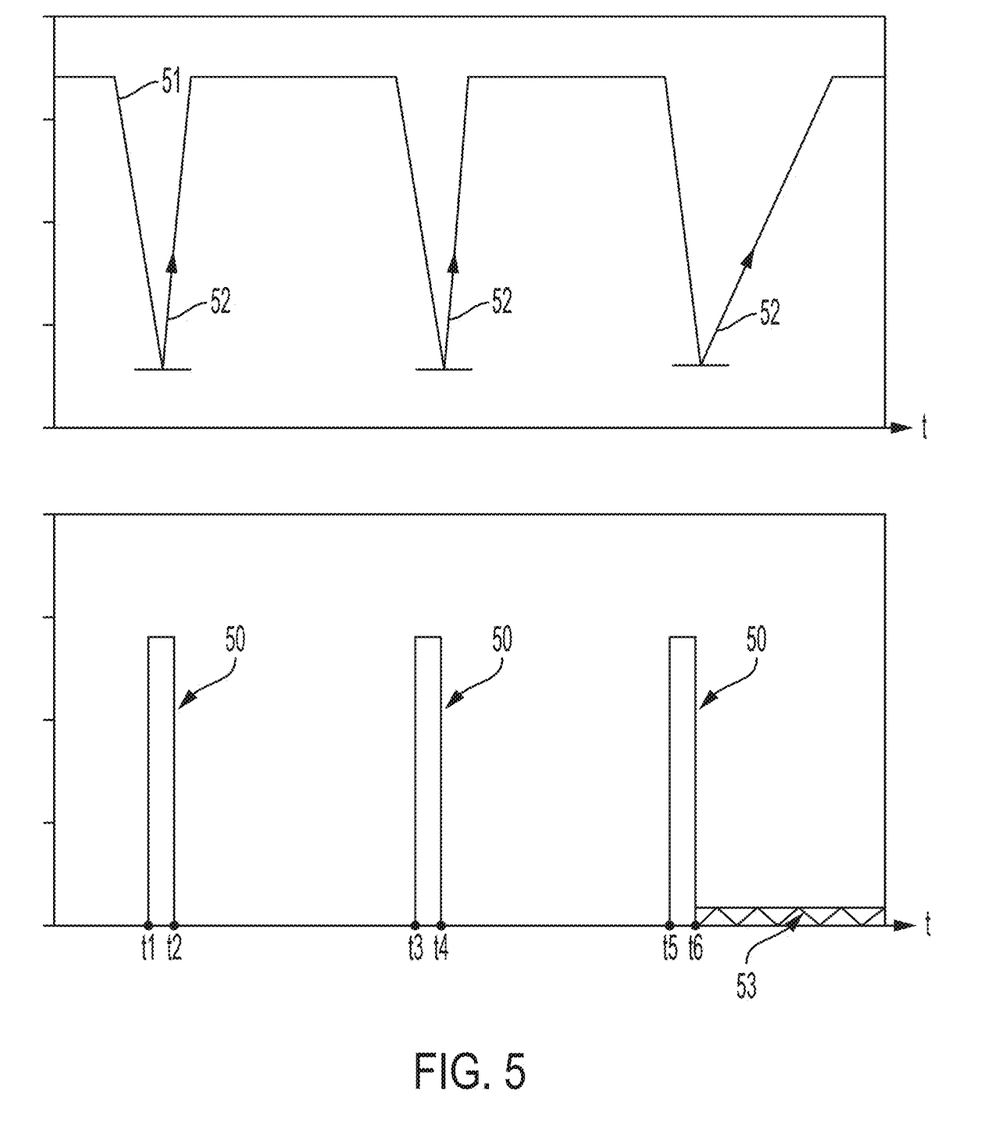
FIG. 5 shows a time diagram further illustrating the first embodiment.

FIG. 5 shows a time diagram further illustrating the first embodiment of the invention. FIG. 5 shows as a function of the time t a fluid flow rate 50 and a pipe temperature 51 measured by the pipe temperature sensor 17a.

At point of times t1, t3 and t5 a respective fluid flow 50 through the fluid pipe 12 starts. At point of times t2, t4 and t6 the respective fluid flow 50 through the fluid pipe 12 stops because of a closed the fluid valve 14.

After the fluid flow through the fluid pipe 12 has been stopped at the point of times t2, t4 and t6, the temporal gradient 52 of the pipe temperature 51 is calculated. If the calculated temporal gradient 52 of the pipe temperature 51 differs more than the first threshold from the first reference value, and if there is no flow measured by the flow meter 16, then micro-leakage is detected.

In FIG. 5, the temporal gradients 52 calculated at point of times t2, t4 do not differ more than the first threshold from the first reference value. So, no micro-leakage is detected at point of times t2, t4. The temporal gradient 52 calculated at point of times t6 differs more than the first threshold from the first reference value. So, micro-leakage 53 is detected at point of times t6. The first reference value may correspond to the average of the temporal gradients 52 calculated at point of times t2, t4.

As mentioned above, a second embodiment of the invention makes use of the first and second pipe temperature sensors 17a, 17b and of the flow meter 16.

In this second embodiment the pipe temperature of the fluid pipe 12 is measured by the first pipe temperature sensor 17a and by the second pipe temperature sensor 17b being positioned at different locations of the fluid pipe 12.

The pipe temperature sensors 17a and 17b have a different distance to the fluid valve 14. The pipe temperature sensor 17b is positioned closer to the fluid valve 14 than the pipe temperature sensor 17a. The distance between the pipe temperature sensors 17a and 17b may be at least 20 cm.

When there is no fluid flow measured by the flow meter 16 for a defined time interval, a temperature difference between the pipe temperatures measured by the first and second pipe temperature sensors 17a and 17b is calculated. If the temperature difference between these pipe temperatures differs more than a second threshold from a second first reference value, and if there is no flow measured by the flow meter 16, then micro-leakage is detected.

Figure 3:
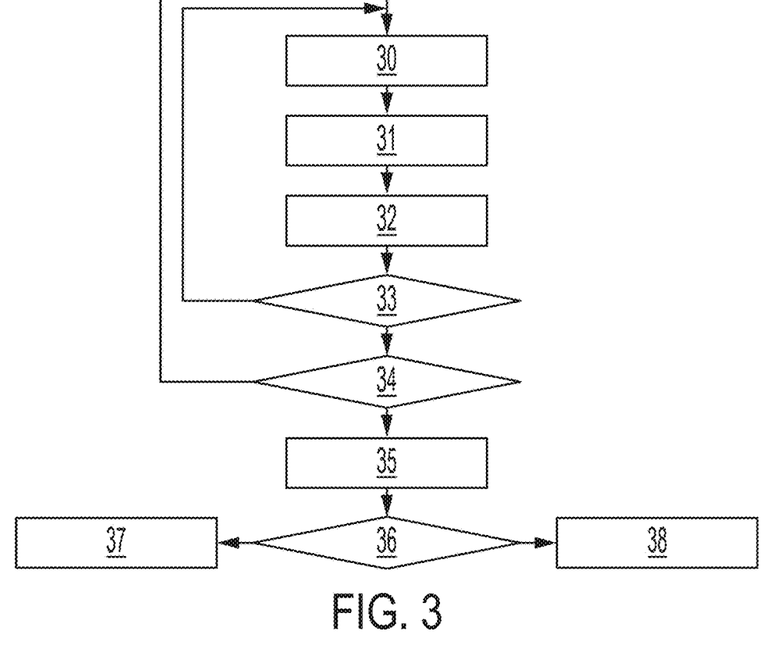
FIG. 3 shows a signal flow diagram illustrating a second embodiment.

FIG. 3 shows a signal flow diagram for the second embodiment of the invention.

In step 30 the flow meter 16 measures the fluid flow though the fluid pipe 12. In step 31 the first pipe temperature sensor 17a measures the pipe temperature of the fluid pipe 12. In step 32 the second pipe temperature sensor 17b measures the pipe temperature of the fluid pipe 12.

In step 33 it is determined if the flow meter 16 measures no fluid flow through the pipe. If this is not the case, the method goes back to step 30. If this is the case, the method goes to step 34.

In step 34 it is determined if the flow meter 16 measured no fluid flow through the fluid pipe 12 for a defined time interval after the fluid flow has been stopped. If this is not the case, the method goes back to step 30. If this is the case, the method goes to step 35.

In step 35 the temperature difference between the pipe temperatures measured by the first and second pipe temperature sensors 17a and 17b is calculated.

Then, in step 36 it is determined if this temperature difference differs more than a second threshold from the second reference value or not.

If this temperature difference does not differ more than the second threshold from the second reference value, no micro-leakage is detected in step 37.

If this temperature difference differs more than the second threshold from the second reference value, and if there is still no fluid flow measured by the flow meter 16, then in step 38 micro-leakage is detected.

The second reference value is determined as follows: If there is no fluid flow measured for the defined time interval, then calculate and store the temperature difference between the pipe temperatures measured by the first and second pipe temperature sensors 17a, 17b. Calculate an average value from the stored temperature differences. Determine the second threshold from this average value.

The average value may be multiplied by a security-factor to determine the second reference value.

The calculation of the temperature difference between the pipe temperatures measured by the first and second pipe temperature sensors 17a, 17b may take place at each sampling time of the sampling rate. However, said temperature difference may not be stored at each sampling time of the sampling rate. It is possible that said calculated temperature difference is stored example given every 10 times or every 20 times or every 50 times or every 100 times after calculation of the same. Said calculated temperature difference may be stored in a ring buffer of the memory 15e of the micro-leakage detection apparatus 15. The ring buffer may have a defined buffer size. If the ring buffer is completely filled, then the average value may be calculated. If the ring buffer is not completely filled, then the average value may not be calculated. If the ring buffer is completely filled and if a newly calculated temperature difference between the pipe temperatures measured by the first and second pipe temperature sensors 17a, 17b is to be stored, then the oldest one of the stored temperature differences becomes replaced by the newly calculated temperature difference and the average value is newly calculated.

The calculated temperature difference may only be stored and used to calculate the average value if the absolute value of a difference between the calculated temperature difference and a previously calculated temperature difference or if the absolute value of a difference between the calculated temperature difference and an average value of previously stored temperature differences is below a threshold.

Figure 6:
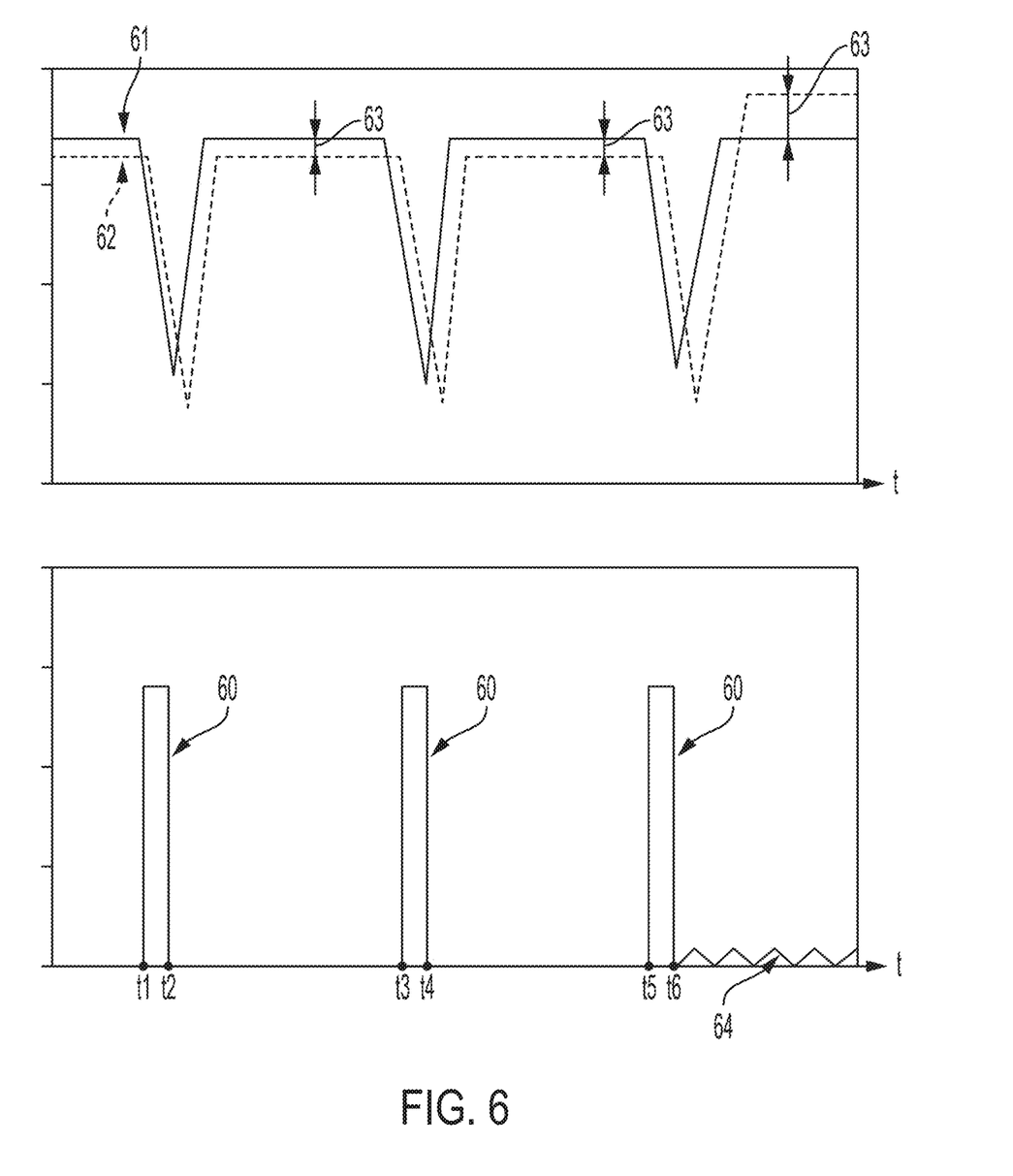
FIG. 6 shows a time diagram further illustrating the second embodiment.

FIG. 6 shows a time diagram further illustrating the second embodiment of the invention. FIG. 6 shows as a function of the time t a fluid flow rate 60 and pipe temperatures 62, 63 measured by the pipe temperature sensors 17a, 17b.

At point of times t1, t3 and t5 a respective fluid flow 60 through the fluid pipe 12 starts. At point of times t2, t4 and t6 the respective fluid flow 60 through the fluid pipe 12 stops.

When there is no fluid flow measured by the flow meter 16 for a defined time interval after the fluid flow through the fluid pipe 12 has been stopped by closing the fluid valve 14 at the point of times t2, t4 and t6, a temperature difference 63 between the pipe temperatures 61, 62 measured by the first and second pipe temperature sensors 17a, 17b is calculated. The condition that the fluid flow has been stopped can be detected on basis of the signal provided by the flow meter 16, namely when there is fluid flow measured by the flow meter 16 and subsequently no fluid flow measured by the flow meter 16.

If the temperature difference 63 between the pipe temperatures 61, 62 differs more than the second threshold from the second reference value, and if there is no flow measured by the flow meter 16, then micro-leakage 64 is detected.

In FIG. 6, the temperature differences 63 calculated a defined time interval after the point of times t2, t4 do not differ more than the second threshold from the second reference value. So, no micro-leakage is detected. The temperature difference 63 calculated a defined time interval after the point of time t6 differs more than the second threshold from the second reference value. So, micro-leakage 64 is detected. The second reference value may correspond to the average of the temperature differences 63 calculated the defined time interval after the point of times t2, t4.

The above first and second embodiments are preferred. The same do not require the measurement of the ambient temperature. Such an ambient temperature independent micro-leakage detection is very simple and reliable.

It is possible to use the first and second embodiment in combination. So, micro-leakage may be detected if the temporal gradient of the pipe temperature differs more than the first threshold from the first reference value or if the temperature difference between the pipe temperatures differs more than the second threshold from the second reference value.

A third embodiment makes use of the ambient temperature sensor 18.

In this third embodiment, the ambient temperature is measured by the ambient temperature sensor 18. When there is no fluid flow measured by the flow meter 16 for a defined time interval, then a temperature difference between the pipe temperature and the ambient temperature is calculated.

If the temperature difference between the pipe temperature and the ambient temperature differs more than a third threshold from a third reference value, and if there is still no flow measured by the flow meter 16, then micro-leakage is detected.

Figure 4:
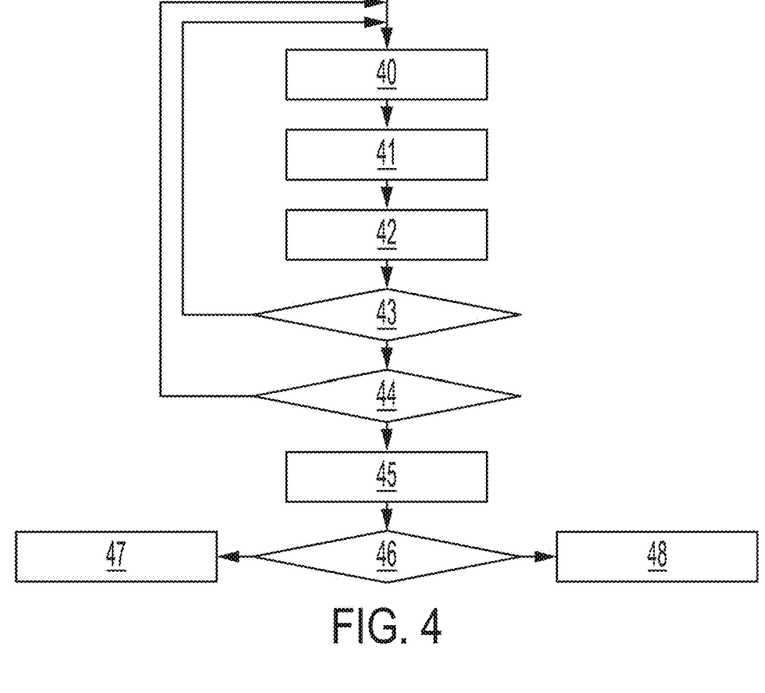
FIG. 4 shows a signal flow diagram illustrating a third embodiment.

FIG. 4 shows a signal flow diagram for the third embodiment of the invention.

In step 40 the flow meter 16 measures the fluid flow though the fluid pipe 12. In step 41 at least one of pipe temperature sensors 17a, 17b measures the pipe temperature. In step 42 the ambient temperature sensor 18 measures the ambient temperature.

In step 43 it is determined if the flow meter 16 measures no fluid flow through the fluid pipe 12. If this is not the case, the method goes back to step 40. If this is the case, the method goes to step 44.

In step 44 it is determined if the flow meter 16 measured no fluid flow through the fluid pipe 12 for a defined time interval. If this is not the case, the method goes back to step 40. If this is the case, the method goes to step 45.

In step 45 the temperature difference between the pipe temperature measured by the respective pipe temperature sensor 17a, 17b and the ambient temperature measured by the ambient temperature sensor 18 is calculated.

Then, in step 46 it is determined if this temperature difference differs more than a third threshold from the third reference value or not. If this temperature difference does not differ more than the third threshold from the third reference value, no micro-leakage is detected in step 46. If this temperature difference differs more than the third threshold from a third reference value, and if there is still no fluid flow measured by the flow meter 16, then in step 47 micro-leakage is detected.

The third threshold for the temperature difference between the pipe temperature and the ambient temperature may be determined as follows: If there is no fluid flow measured for the defined time interval, then calculate and store the temperature difference between the pipe temperature and the ambient temperature.

Calculate an average value from the stored temperature differences. Determine the first threshold from this average value. The average value may be multiplied by a factor to determine the third reference value.

The calculation of the temperature difference between pipe temperature and the ambient temperature may take place at each sampling time of the sampling rate. However, said temperature difference may not be stored at each sampling time of the sampling rate. It is possible that said calculated temperature difference is stored example given every 10 times or every 20 times or every 50 times or every 100 times after calculation of the same. Said calculated temperature difference may be stored in a ring buffer of the memory 15e of the micro-leakage detection apparatus 15. The ring buffer may have a defined buffer size. If the ring buffer is completely filled, then the average value may be calculated. If the ring buffer is not completely filled, then the average value may not be calculated. If the ring buffer is completely filled and if a newly calculated temperature difference between the pipe temperature and the ambient temperature is to be stored, then the oldest one of the stored temperature differences becomes replaced by the newly calculated temperature difference and the average value is newly calculated.

The calculated temperature difference may only be stored and used to calculate the average value if the absolute value of a difference between the calculated temperature difference and a previously calculated temperature difference or if the absolute value of a difference between the calculated temperature difference and an average value of previously stored temperature differences is below a threshold.

Figure 7:
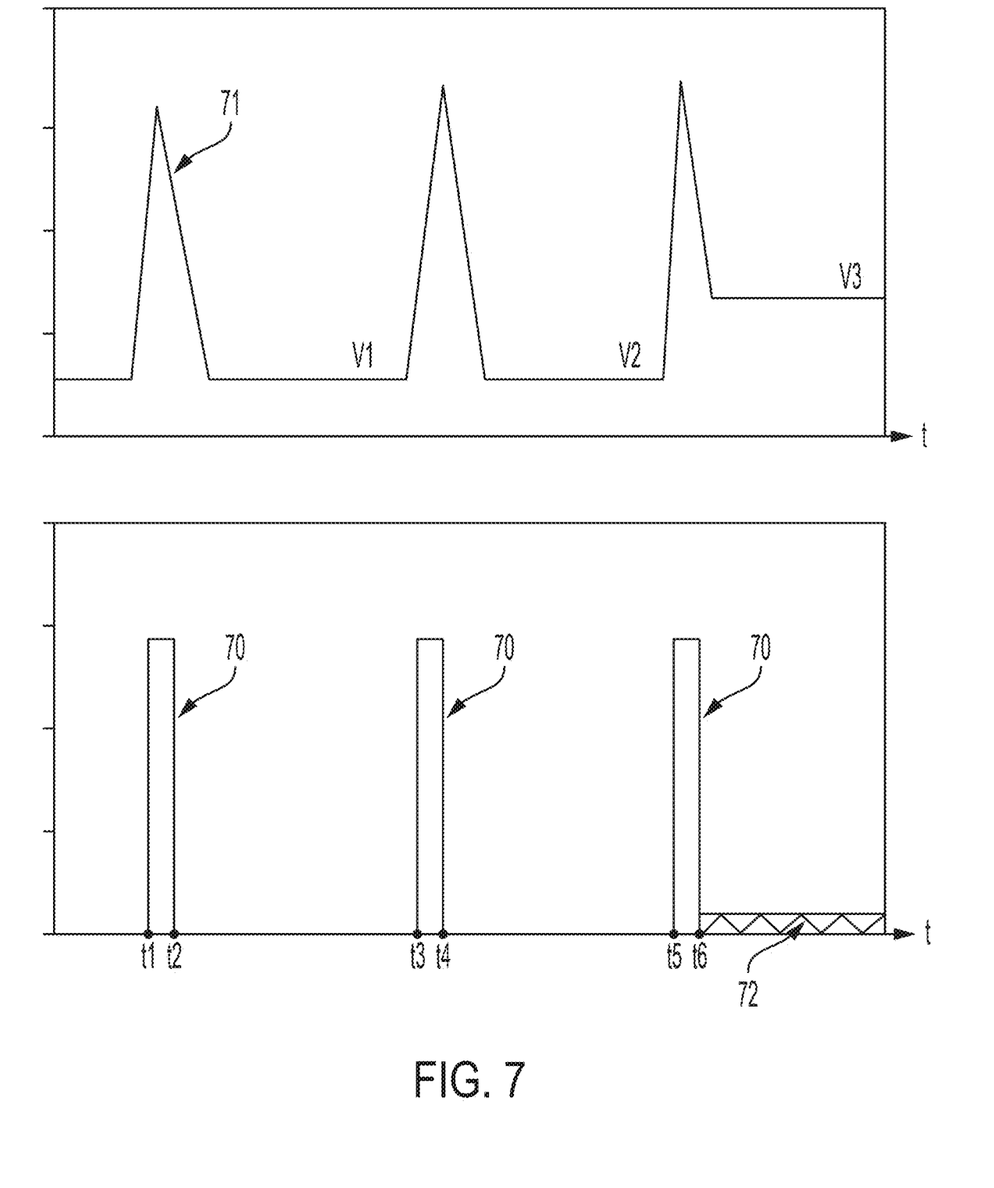
FIG. 7 shows a time diagram further illustrating the third embodiment.

FIG. 7 shows a time diagram further illustrating the third embodiment of the invention. FIG. 7 shows as a function of the time t a fluid flow rate 70 and a temperature difference 71 between the pipe temperature measured by one of the pipe temperature sensors 17a, 17b and the ambient temperature.

At point of times t1, t3 and t5 a respective fluid flow 70 through the fluid pipe 12 starts. At point of times t2, t4 and t6 the respective fluid flow 70 through the fluid pipe 12 stops by closing the fluid valve 14. When there is no fluid flow measured by the flow meter 16 for a defined time interval after the fluid flow through the fluid pipe 12 has been stopped at the point of times t2, t4 and t6, the temperature difference 71 is determined. If the temperature difference 71 between the pipe temperature and the ambient temperature differs more than the third threshold from the third reference value, and if there is no flow measured by the flow meter 16, then micro-leakage 73 is detected.

In FIG. 7, the values V1, V2 of temperature difference 71 determined a defined time interval after the point of times t2, t4 do not differ more than the third threshold from the third reference value. So, no micro-leakage is detected. The value V3 of the temperature difference 71 determined a defined time interval after the point of time t6 differs more than the third threshold from the third reference value. So, micro-leakage 72 is detected. The third reference value may correspond to the average of the temperature difference values V1, V2 calculated the defined time interval after the point of times t2, t4.

It is possible to use the third embodiment in combination with the first and/or second embodiment. So, micro-leakage may be detected if the temporal gradient of the pipe temperature differs more than the first threshold from the first reference value or if the temperature difference between the pipe temperature and the ambient temperature differs more than the third threshold from the third reference value.

Further on, micro-leakage may be detected if the temperature difference between the two pipe temperatures differs more than the second threshold from the second reference value or if the temperature difference between the pipe temperature and the ambient temperature differs more than the third threshold from the third reference value.

The invention allows micro-leakage detection in the magnitude of less than 1 liter per hour. Such a micro-leakage flow rate is below a measuring resolution or a measuring range of the flow meter 16.

LIST OF REFERENCE SIGNS 10 fluid flow system
11 building
12 fluid pipe
13 main water pipe
14 fluid valve
15 micro-leakage detection apparatus
15a interface
15b interface
15c interface
15d processor
15e memory
16 flow meter
17a pipe temperature sensor
17b pipe temperature sensor
18 ambient temperature sensor
20 step
21 step
22 step
23 step
24 step
25 step
26 step
27 step
30 step
31 step
32 step
33 step
34 step
35 step
36 step
37 step
38 step
40 step 41 step
42 step
43 step
44 step
45 step
46 step
47 step
48 step
50 fluid flow rate
51 pipe temperature
52 temporal gradient
53 micro-leakage
60 fluid flow rate
61 pipe temperature
62 pipe temperature
63 temperature difference
64 micro-leakage
70 fluid flow rate
71 temperature difference
72 micro-leakage

The invention claimed is:

1. A method for micro-leakage detection in a fluid system, wherein the fluid system has a fluid pipe with a fluid valve,
wherein a fluid flow through the fluid pipe is stopped when the fluid valve is closed, and
wherein a fluid flow through the fluid pipe is allowed when the fluid valve is opened,
the method comprising:
   measuring the fluid flow through the fluid pipe by a flow meter;
   measuring a pipe temperature of the fluid pipe by at least one pipe temperature sensor;
   calculating and storing a temporal gradient of the pipe temperature when there is no fluid flow measured by the flow meter after the fluid flow through the fluid pipe has been stopped;
   if the calculated temporal gradient of the pipe temperature differs more than a first threshold from a first reference value and if there is no fluid flow measured by the flow meter, then detect micro-leakage;
   wherein determining the first reference value comprises:
      calculating an average value from the stored temporal gradients; and
         determining the first threshold from the average value.

2. The method as claimed in claim 1, wherein the pipe temperature of the fluid pipe is measured by the at least one pipe temperature sensor when fluid flow is measured by the flow meter and when no fluid flow is measured by the flow meter; and
   wherein the measured fluid flow is analyzed for the micro-leakage detection when there is no fluid flow measured by the flow meter.

3. The method as claimed in claim 1, wherein the pipe temperature of the fluid pipe is measured by the at least one pipe temperature sensor and analyzed for the micro-leakage detection when there is no fluid flow measured by the flow meter.

4. A micro-leakage detection apparatus configured for micro-leakage detection in a fluid system, the micro-leakage detection apparatus comprising:
   an interface configured to receive a signal from a flow meter measuring the fluid flow through a fluid pipe of the fluid system;
   an interface configured to receive a signal from at least one pipe temperature sensor measuring the pipe temperature of the fluid pipe and
   a processor configured to detect micro-leakage by analyzing the pipe temperature when there is no fluid flow measured by the flow meter as claimed in claim 1.

5. The method as claimed in claim 1, wherein the calculated temporal gradient is stored and used to calculate the average value if the absolute value of a difference between the calculated temporal gradient and a previously calculated temporal gradient or if the absolute value of a difference between the calculated temporal gradient and an average value of previously stored temporal gradients is below a threshold.

6. The method as claimed in claim 5, wherein the average value is multiplied by a factor to determine the first reference value.

7. A method for micro-leakage detection in a fluid system,
   wherein the fluid system has a fluid pipe with a fluid valve,
   wherein a fluid flow through the fluid pipe is stopped when the fluid valve is closed, and
   wherein a fluid flow through the fluid pipe is allowed when the fluid valve is opened,
   the method comprising:
      measuring the fluid flow through the fluid pipe by a flow meter;
      measuring a pipe temperature of the fluid pipe by a first pipe temperature sensor and by a second pipe temperature sensor, the first pipe temperature sensor and the second pipe temperature sensor being positioned at different locations of the fluid pipe;
      calculating a temperature difference between the pipe temperatures measured by the first and second pipe temperature sensors when there is no fluid flow measured by the flow meter for a defined time interval; and
      if the temperature difference between the pipe temperatures differs more than a second threshold from a second reference value, and if there is no fluid flow measured by the flow meter, then detect micro leakage.

8. The method as claimed in claim 7, comprising determining the second reference value, wherein determining the second reference value includes:
   if there is no fluid flow measured for the defined time interval, calculating and storing the temperature difference between the pipe temperatures measured by the first and second pipe temperature sensors;
   calculating an average value from the stored temperature differences; and
   determining the second threshold from the average value.

9. The method as claimed in claim 8, wherein the average value is multiplied by a factor to determine the second reference value.

10. The method as claimed in claim 9, comprising:
   measuring an ambient temperature by at least one ambient temperature sensor;
   calculating a temperature difference between the pipe temperature and the ambient temperature when there is no fluid flow measured by the flow meter for a defined time interval; and
   if the temperature difference between the pipe temperature and the ambient temperature differs more than a third threshold from a third reference value, and if there is no fluid flow measured by the flow meter, then detect micro-leakage.

11. The method as claimed in claim 10, comprising determining the third reference value for the temperature difference between the pipe temperature and the ambient temperature, the determining including:
  if there is no fluid flow measured for the defined time interval, calculating and storing the temperature difference between the pipe temperature and the ambient temperature;
  calculating an average value from the stored temperature differences; and
  determining the third threshold from the average value.

12. The method as claimed in claim 11, wherein the calculated temperature difference is stored and used to calculate the average value if the absolute value of a difference between the calculated temperature difference and a previously calculated temperature difference or the absolute value of a difference between the calculated temperature difference and an average value of previously stored temperature differences is below a threshold.

13. The method as claimed in claim 12, wherein the average value is multiplied by a factor to determine the third reference value.

* * * * *